Feb. 6, 1934.    L. E. LUBBERS    1,946,167
FIFTH WHEEL LOCK
Filed Nov. 24, 1933    2 Sheets-Sheet 1
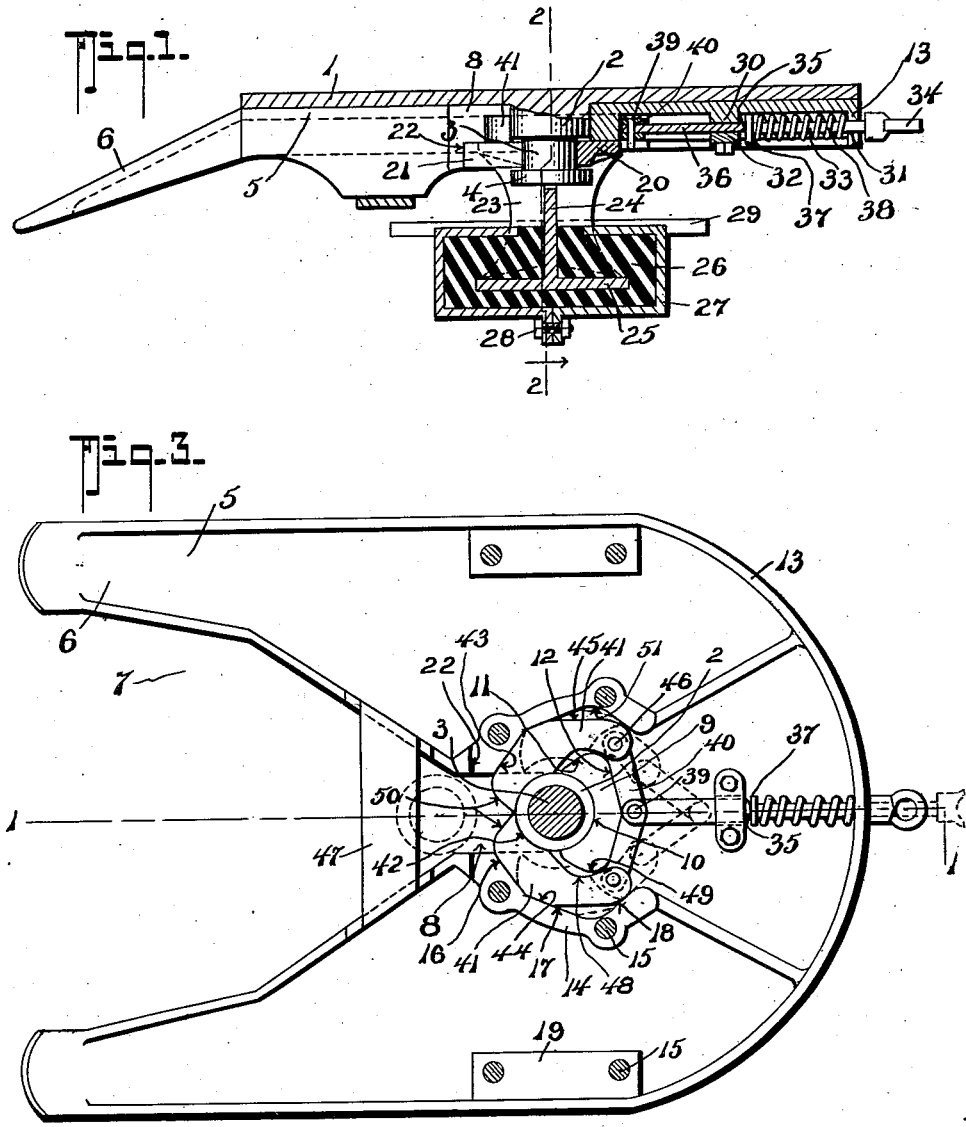
Inventor
L. E. Lubbers.
By Albert E Dieterich
Attorney Feb. 6, 1934.   L. E. LUBBERS   1,946,167
FIFTH WHEEL LOCK
Filed Nov. 24, 1933   2 Sheets-Sheet 2
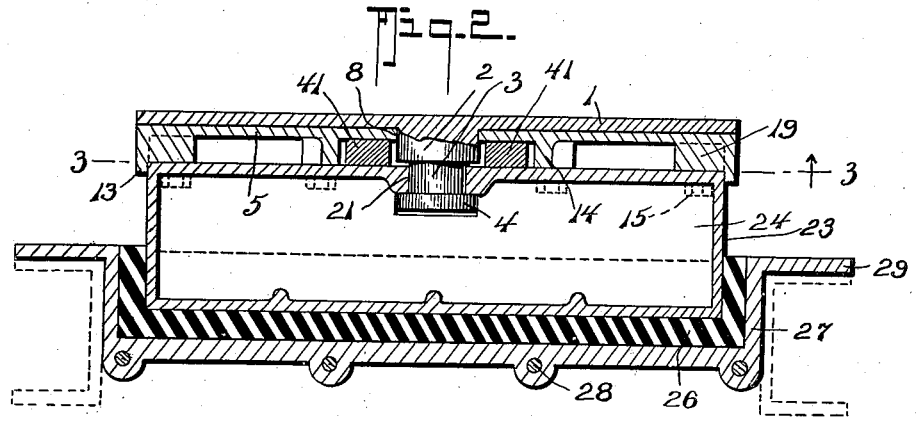
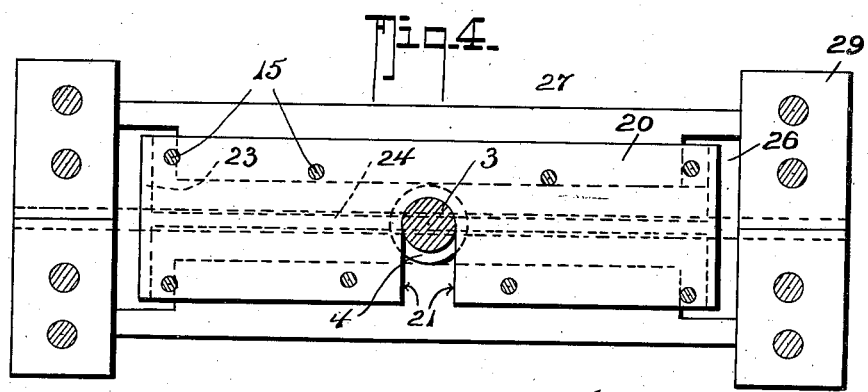
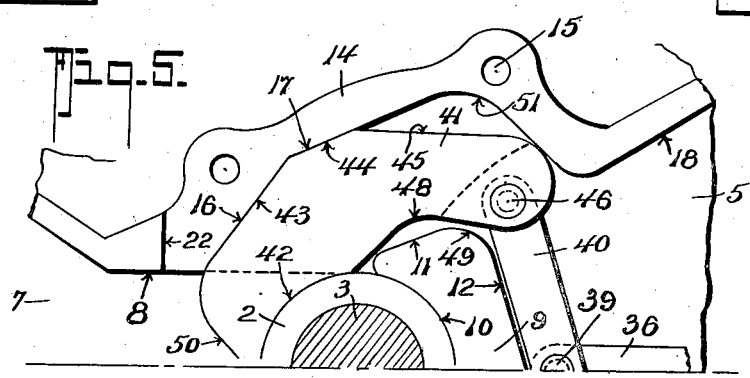
Inventor
*L. E. Lubbers*
By *Albert E. Dieterich*
Attorney Patented Feb. 6, 1934

1,946,167

UNITED STATES PATENT OFFICE 1,946,167

FIFTH WHEEL LOCK

Lubbert E. Lubbers, Stoughton, Wis., assignor to The New Stoughton Company, Stoughton, Wis., a corporation of Wisconsin Application November 24, 1933
Serial No. 699,612

12 Claims. (Cl. 280—33.1)

My invention relates to the art of road vehicles and particularly the coupling means employed between a towing vehicle (such as a tractor for example) and a towed vehicle (such as a trailer for example). Such coupling means usually embodies a fifth wheel comprising an upper plate and a lower plate, the former being carried by the trailer and the latter being carried by the tractor. One of said plates has a king pin that enters the slot in the other of said plates, in which slot the king pin is locked by some suitable device. It is to the locking means that my present invention is especially directed.

One of the objects of the invention is to provide an automatic safety lock for semi-trailer king pin connection by means of two locking pawls held firmly in place while in operation by reason of their unusual shape and contour.

Another object is further to lock the pawls in position, while the king pin is engaged, by means of two links connecting the forward ends of the lock pawls to a release rod, said links being placed in such a position that the lock pawls cannot disengage until the angle of the links is changed through a forward pull of the release rod.

Another object is to provide a large bearing surface for the king pin while engaged in a pulling position.

Further, it is an object to provide sufficient bearing surface for the locking pawls on the outer side where pawls contact the retaining boss of the fifth wheel plate forming a wedge shaped slot, thus distributing the pressure created by the king pin, while the trailer is in operation, over a large area.

Further, it is an object to provide a construction of such character that natural wear on the king pin, lock pawls, or lock pawl retaining boss will not affect the security or efficiency of the lock, by reason of the fact that the wedged shape of the lock as a whole and its direct bearing surface on the boss readily adjusts itself to any condition that may be brought about through such natural wear.

A further object is to provide a locking device of such design and construction as to provide maximum safety because of the positive and permanent position of the lock pawls while under pulling pressure and further because their stability is not dependent upon studs or bolts.

Another object is to provide a locking device embodying the above mentioned characteristics which has a minimum number of working parts.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, then be particularly pointed out in the appended claims, reference being had to the accompanying drawings, in which:—

Figure 1 is a central vertical longitudinal section of a fifth wheel with my invention embodied thereon, the section being taken substantially on the line 1—1 of Figure 3.

Figure 2 is a cross section on the line 2—2 of Figure 1.

Figure 3 is a horizontal section on the line 3—3 of Figure 2, looking upwardly.

Figure 4 is a horizontal section on the line 3—3 of Figure 2 looking downwardly.

Figure 5 is an enlarged inverted plan view of a portion of the invention.

In the drawings in which like numerals of reference designate like parts in all of the figures, 1 represents the upper plate of the fifth wheel. It is this plate which usually carries the king pin, the latter comprising a body 2, a neck 3 and a head 4.

The lower plate 5 of the fifth wheel is usually provided with inclined wings 6 separated by a V-shaped passage 7 that merges with a king pin slot 8, at the forward end of which there is a fixed abutment 9 having a seat 10 against which the body of the king pin rests when the parts are coupled together.

The boss 9 has rearwardly converging outer wall portions 11 and forwardly converging outer wall portions 12, the purpose of which will presently appear.

The plate 5 is bounded by a marginal flange 13 which is cross-braced at 47 over the passage 7 adjacent its inner ends.

14 designates a pair of bosses at each side of the king pin slot 8 which are spaced from and cooperate with the boss 9 to provide latch ways in which the latches 41 have a somewhat curvilinear movement in passing from one position to another.

The bosses 14 have threaded holes 15 for cap screws or bolts as have also the side bosses 19.

The bosses 14 have abrupt rearwardly converging walls 16 and gradually rearwardly-converging wall portions 17. They also have forwardly converging wall portions 18 which merge with the portions 17 through curved portions 51.

The top cross plate 20 of the mounting bracket engages the bosses 14 and 19 to which it is secured by suitable cap screws entering the threaded apertures 15. The cross plate 20 is slotted at 21 to permit passage of the neck 3 of the king pin and it is provided with a slotted king pin seat 21 that engages a shoulder 22 in the flange portions 6 adjacent the V-shaped passage 7.

23 designates the forwardly and rearwardly extending webs of the mounting bracket while 24 indicates the cross web, the webs 23 and 24 being formed integral with the base web or flange 25, the latter being embedded in a suitable rubber cushion 26 carried in a mounting box 27 composed of sections secured together as at 28, there being a flange 29 provided on the sections of the box by means of which it may be mounted on the frame of the vehicle.

The construction of the mounting box and that portion of the bracket cooperating with it constitutes no part of the present application, as it comprises the subject matter of a copending application Serial Number 699,611, November 24, 1933 filed by me on even date herewith.

A rod bearing lug 30 is cast on the underside of the plate 5 and is provided with a cap 32, the lug 30 and the bearing aperture 31 in the forward flange 6 serving as a bearing for the latch rod 33. The latch rod has a pull eye 34 at its outer end and has a flattened portion 36 at its inner end, the latter operating in the bearing 30 and being connected by links 40 to the latch members 41, the links being pivoted to the latch rod portion 36 of the latch rod as at 39 and to the latches 41 as at 46.

37 designates the latch rod spring abutment washer which engages the shoulder 35 of the latch rod. 38 is the spring which continuously tends to push the latch rod inwardly to bring the links 40 against the surfaces 12 of the abutment 9, thereby spreading the links apart and forcing the latches 41 rearwardly to bring their free ends together in the king pin slot 8.

Each latch pawl 41 is of general curvilinear form in the direction of its length and each is provided with a curved pin seat 42, each covering approximately one-fourth the circumference of the body 2 of the king pin. The latch pawls 41 have outer rearwardly converging faces 43 and 44 which cooperate with the surfaces 16 and 17 respectively of the bosses 14 so that when a pressure is applied against the seats 42 by the king pin the surfaces 43 and 16 will tend to wedge the free ends of the latches together and thus prevent any accidental separation of those ends due to the strain on the king pin.

The outer ends of the latches 41 have rearwardly diverging portions 50 so that the king pin may engage the same to force the latch pawls 41 forwardly and spread their free ends apart to permit the king pin to pass to its seat.

The latch pawls 41 also have surfaces 45, which cooperate with the surfaces 18, and surfaces 48 which cooperate with the surfaces 49 to swing the forward or linked ends of the latch pawls toward each other when a pull is applied to the latch rod 33 or when the pawls are pushed forwardly by the king pin engaging the surfaces 50.

It will be seen that the top plate 20 of the mounting bracket serves as a closure for the locking pawl ways and holds those pawls against dropping out.

It will be seen by reference to the accompanying drawings, with my construction each locking pawl has a sliding action in a general curvilinear path guided by a substantial slot in the fifth wheel casting, this movement of the locking pawls being effected either by pulling the rod 33 as when it is desired to uncouple the vehicle, or it is effected mechanically by the king pin engaging the surfaces 50 in coupling the vehicles together, the latter action being automatic.

The normal position of the locking pawls and links is shown in full lines in Figure 3, while the dotted lines indicate the position of the parts when the pawls are separated to permit the release of the king pin (uncoupling) or to permit the king pin passing to its seat (coupling). The normal position of the connecting links 40 provides a feature of safety if either of the locking pawls has a tendency to assume a disengaged position. The least amount of pressure on either one of the connecting links will force the opposite pawl into a firmer position, it being understood that there is sufficient play in the bearing 30 to permit a slight lateral movement of the part 36 therein.

It will also be noted from the foregoing description and the accompanying drawings that practically the entire circumference of the king pin is utilized for bearing purposes, the front half bearing against the surface 10 of the boss 9 and the rear half bearing against the surface 42 of the pawls 41. This gives a large bearing surface which reduces wear to a minimum.

This application is a substitution for an application filed by me October 22, 1931, Serial Number 570,485, allowed April 8, 1932.

From the foregoing description, taken in connection with the accompanying drawings, it is thought the complete construction, operation and advantages of my invention will be clear to those skilled in the art to which it relates.

What I claim is:

1. In a fifth wheel, a lower plate having a king pin receiving slot with a pin seat at one end, approximately arcuate latchways in said plate at either side of said seat, a pair of latch pawls located in said latchways and yieldable means to hold said pawls to close said slot, said pawls having king pin seat surfaces.

2. In a fifth wheel, a lower plate having a king pin receiving slot with a pin seat at one end, approximately arcuate latchways in said plate at either side of said seat, a pair of latch pawls located in said latchways and yieldable means to hold said pawls to close said slot, said pawls having king pin seat surfaces, the walls of said latchways and the adjacent walls of said latch pawls including inclined portions serving to wedge the latches together when the king pin pressure against the king pin seat surfaces of the latch pawls is applied.

3. In a fifth wheel, a lower plate having a king pin receiving slot with a pin seat at one end, approximately arcuate latchways in said plate at either side of said seat, a pair of latch pawls located in said latchways and yieldable means to hold said pawls to close said slot, said pawls having king pin seat surfaces, the walls of said latchways and the adjacent walls of said latch pawls including inclined portions serving to wedge the latches together when the king pin pressure against the king pin seat surfaces of the latch pawls is applied, the latch pawls having diverging ends whereby the king pin in passing along said king pin receiving slot toward its seat will force said latches along their ways to spread their ends apart and permit the king pin to pass to its seat.

4. In a fifth wheel, a lower plate having a king pin receiving slot with a pin seat at one end, approximately arcuate latchways in said plate at either side of said seat, a pair of latch pawls located in said latchways and yieldable means to hold said pawls to close said slot, said pawls having king pin seat surfaces, said yieldable means comprising a spring pressed rod and links connecting it to said latch pawls.

5. In a fifth wheel, an upper plate carrying a king pin, a lower plate having a V-shaped passage terminating in a king pin slot, a fixed abutment boss on said lower plate at the terminus of said king pin slot and having a seat to be engaged by the king pin over approximately one-half its circumference, said lower plate having other bosses cooperative with said abutment boss to provide two pawl ways that extend forwardly from the king pin slot, the rear ends of said pawl ways having rearwardly converging surfaces, latch pawls held in said ways and having pin engaging seats adjacent their free ends, each to engage approximately one-fourth the circumference of the king pin, said pawls having rearwardly converging surfaces to engage with those of said ways to wedge the free ends of the pawls together when pressure is applied by the king pin against the king pin engaging seats of the pawls, and yieldable means continuously acting to hold said pawls with their free ends together in the pin latching position.

6. In a fifth wheel, an upper plate carrying a king pin, a lower plate having a V-shaped passage terminating in a king pin slot, a fixed abutment boss on said lower plate at the terminus of said king pin slot and having a seat to be engaged by the king pin, said lower plate having other bosses cooperative with said abutment boss to provide two pawl ways that extend forwardly from the king pin slot, the rear ends of said pawl ways having rearwardly converging surfaces, latch pawls held in said ways and having pin engaging seats adjacent their free ends, each to engage approximately one-fourth the circumference of the king pin, said pawls having rearwardly converging surfaces to engage with those of said ways to wedge the free ends of the pawls together when pressure is applied by the king pin against the king pin engaging seats of the pawls, and yieldable means continuously acting to hold said pawls with their free ends together in the pin latching position, said pawls having rearwardly diverging end portions whereby the entering king pin may spread the pawls apart and pass to its seat.

7. In a fifth wheel, an upper plate carrying a king pin, a lower plate having a V-shaped passage terminating in a king pin slot, a fixed abutment boss on said lower plate at the terminus of said king pin slot and having a seat to be engaged by the king pin over approximately one-half its circumference, said lower plate having other bosses cooperative with said abutment boss to provide two pawl ways that extend forwardly from the king pin slot, the rear ends of said pawl ways having rearwardly converging surfaces, latch pawls held in said ways and having pin engaging seats adjacent their free ends, each to engage approximately one-fourth the circumference of the king pin, said pawls having rearwardly converging surfaces to engage with those of said ways to wedge the free ends of the pawls together when pressure is applied by the king pin against the king pin engaging seats of the pawls, and yieldable means continuously acting to hold said pawls with their free ends together in the pin latching position, said king pin including a body, a neck and a head, and said pawls engaging the body of the king pin, a mounting bracket secured to said lower plate over said pawl ways as a closure therefor and itself having a slot to receive the neck of the king pin.

8. In a fifth wheel, a king pin carrying member having a king pin thereon, a king pin receiving member comprising a casting having a king pin slot open at one end and provided with an abutment at the other end, means to hold the king pin in the slot in cooperation with said abutment, said means comprising curved ways at either side of the king pin slot, latch pawls in said ways, means to impart longitudinal movement to said latch pawls, which means includes a push and pull rod linked to said latch pawls, a spring continuously tending to move said rod to hold said latch pawls with their free ends together across said slot, said free ends having king pin seats.

9. In a fifth wheel, a king pin carrying member having a king pin thereon, a king pin receiving member comprising a casting having a king pin slot open at one end and provided with an abutment at the other end, means to hold the king pin in the slot in cooperation with said abutment, said means comprising curved ways at either side of the king pin slot, latch pawls in said ways, means to impart longitudinal movement to said latch pawls, which means includes a push and pull rod linked to said latch pawls, a spring continuously tending to move said rod to hold said latch pawls with their free ends together across said slot, said free ends having king pin seats, said free ends also having diverging surfaces, the latter arranged to be engaged by the king pin on entering the king pin slot to move the latch pawls back and separate their ends to pass the king pin to its seat.

10. In a fifth wheel, an upper plate carrying a king pin, a lower plate having a passage terminating in a king pin receiving slot, a king pin abutment at the end of said slot, a pair of king pin latching pawls mounted beneath said lower plate with their rear ends engaged across said slot to hold the king pin against said abutment, guideways for said pawls and means cooperative with said guideways for imparting curvilinear movement to said pawls in their general longitudinal direction for the purposes of passing or releasing the king pin.

11. In a fifth wheel, an upper plate carrying a king pin, a lower plate having a passage terminating in a king pin receiving slot, a king pin abutment at the end of said slot, a pair of king pin latching pawls mounted beneath said lower plate with their rear ends engaged across said slot to hold the king pin against said abutment, guideways for said pawls and means cooperative with said guideways for imparting curvilinear movement to said pawls in their general longitudinal direction for the purpose of passing or releasing the king pin, and means forming a cooperative part of said ways and pawls for causing the ends of said pawls which extend into the slot to be drawn together when pressure is applied to said ends by the engaging king pin when in its coupled position.

12. In a fifth wheel, an upper plate carrying a king pin, a lower plate having a passage terminating in a king pin receiving slot, a king pin abutment at the end of said slot, a pair of king pin latching pawls mounted beneath said lower plate with their rear ends engaged across said slot to hold the king pin against said abutment, guideways for said pawls and means cooperative with said guideways for imparting curvilinear movement to said pawls in their general longitudinal direction for the purpose of passing or releasing the king pin, and means forming a cooperative part of said ways and pawls for causing the ends of said pawls which extend into the slot to be drawn together when pressure is applied to said ends by the engaging king pin when in its coupled position, said pawls having means engaged by the king pin in entering the slot for imparting longitudinal curvilinear motion to said pawls to separate the adjacent ends of the pawls and permit the king pin to pass, and yieldable means continuously tending to move said pawls to bring their latching ends together.

LUBBERT E. LUBBERS.